March 12, 1940.  J. VOTYPKA  2,193,608
VEHICLE BODY
Original Filed May 1, 1937   5 Sheets-Sheet 1
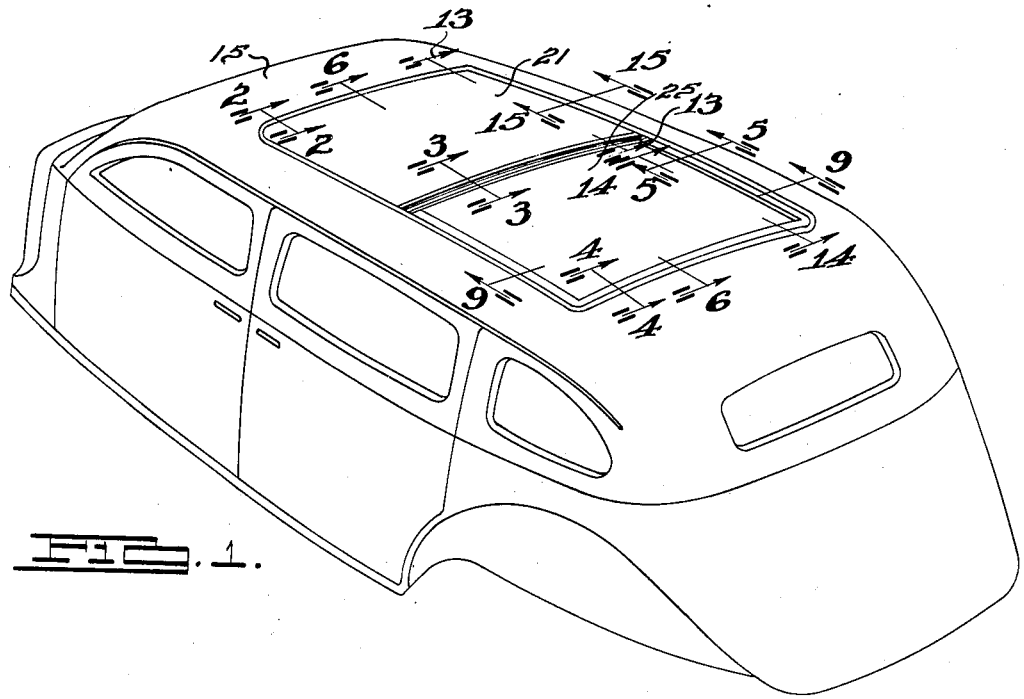
INVENTOR
John Votypka.
BY Dike, Calver & Gray
ATTORNEYS.

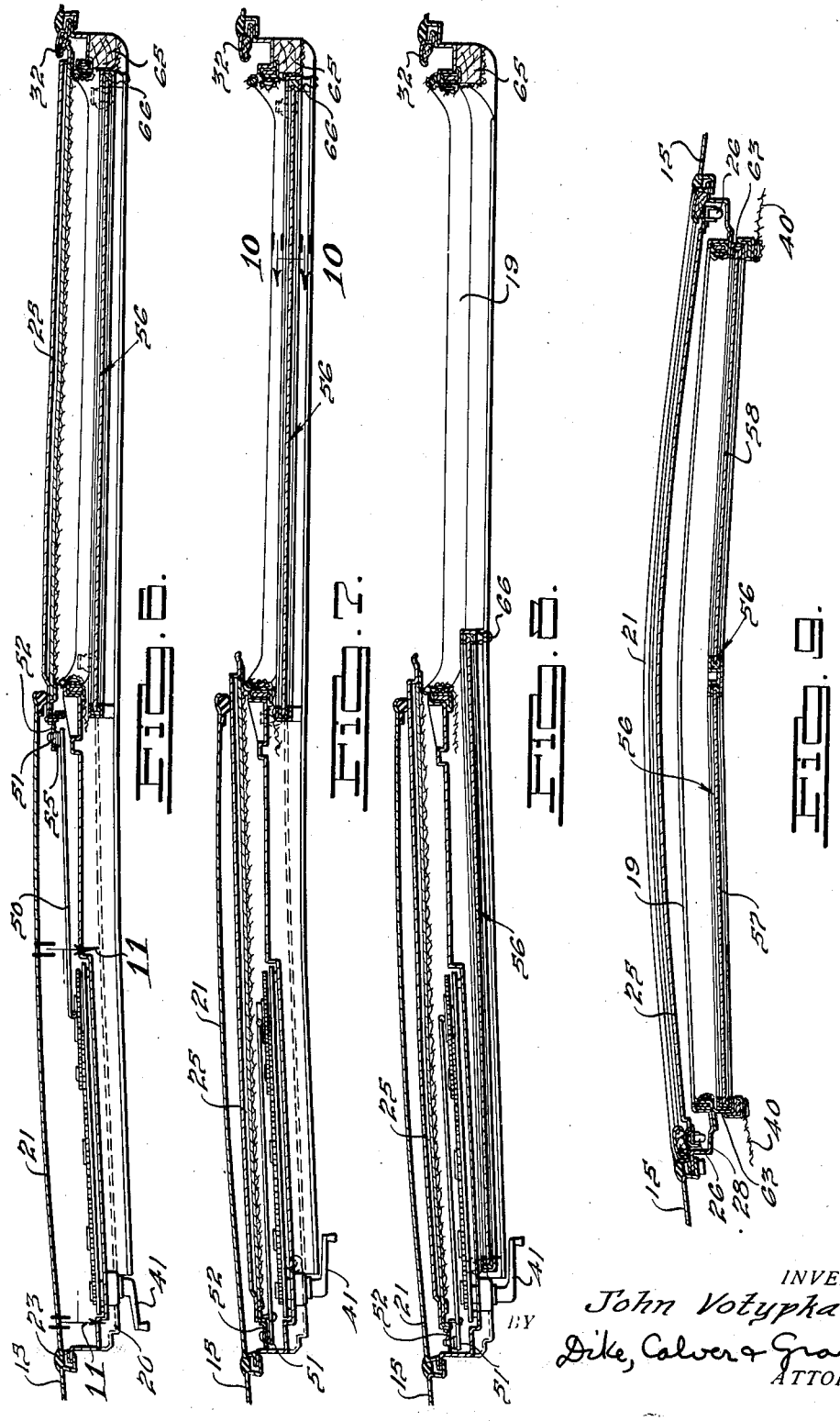

March 12, 1940.   J. VOTYPKA   2,193,608
VEHICLE BODY
Original Filed May 1, 1937   5 Sheets-Sheet 3
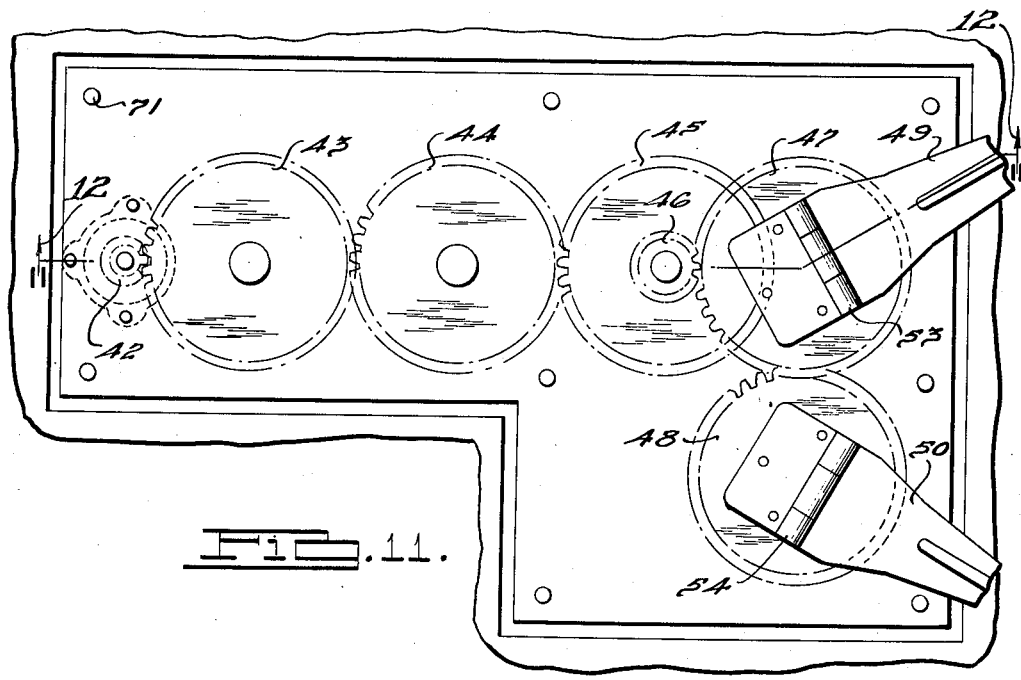
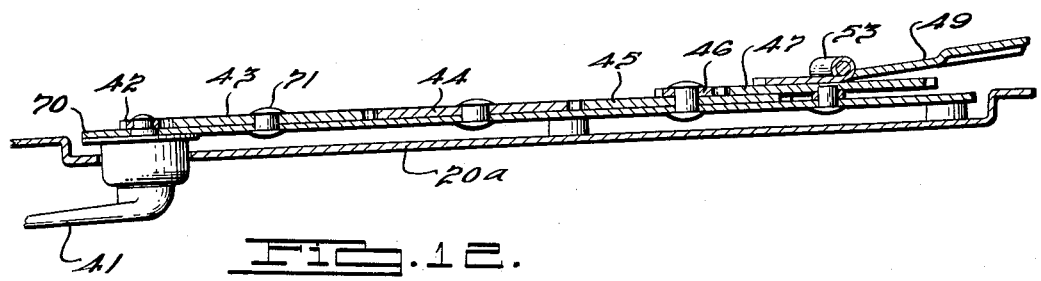
INVENTOR
John Votypka.
BY Dike, Calver & Gray
ATTORNEYS.

March 12, 1940.   J. VOTYPKA   2,193,608
VEHICLE BODY
Original Filed May 1, 1937   5 Sheets-Sheet 4
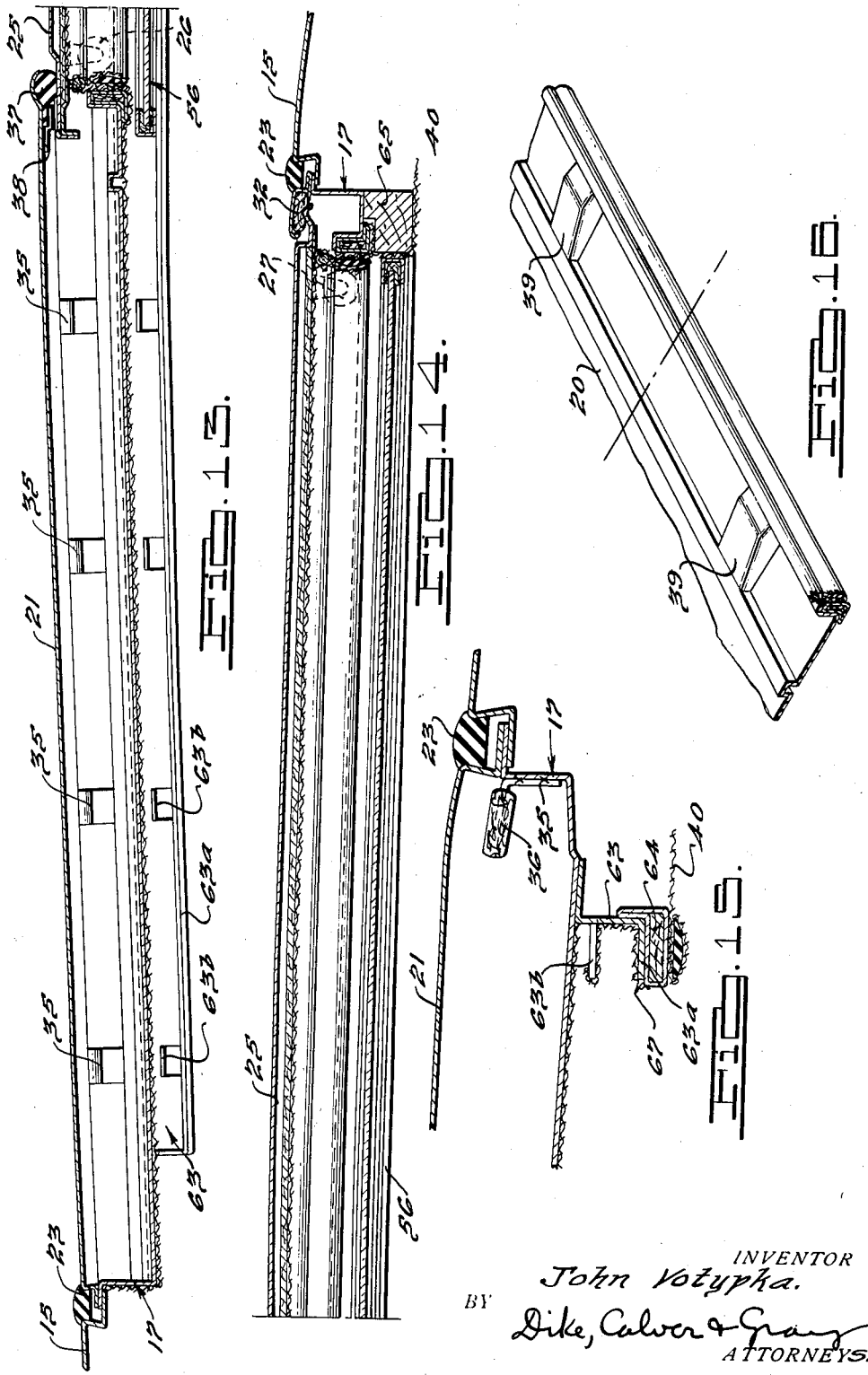
INVENTOR
John Votypka.
BY Dike, Calver & Gray
ATTORNEYS.

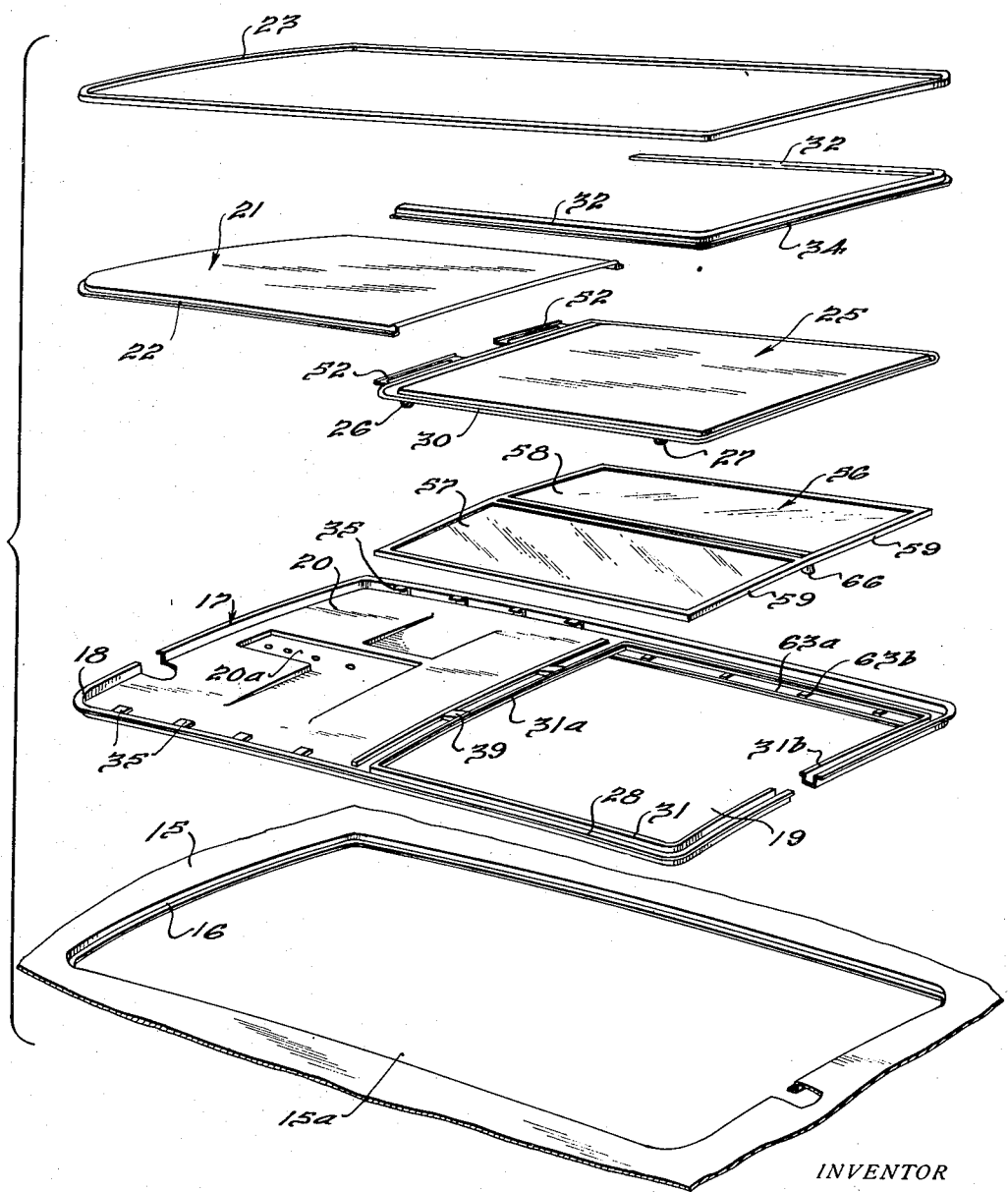

Patented Mar. 12, 1940

2,193,608

UNITED STATES PATENT OFFICE 2,193,608

VEHICLE BODY

John Votypka, Detroit, Mich., assignor to Briggs Manufacturing Company, Detroit, Mich., a corporation of Michigan Application May 1, 1937, Serial No. 140,145
Renewed December 6, 1939

16 Claims. (Cl. 296—137)

This invention relates to vehicle bodies and more particularly, although not exclusively, to closed automobile bodies of the type having an opening in the roof thereof controlled by means of a movable roof panel.

One of the objects of the present invention is to provide a closed vehicle body having a roof with an opening therein and a longitudinally movable or adjustable roof panel supported, guided and controlled in an improved manner, whereby it is possible to attain in a closed vehicle body many advantages heretofore attainable only in bodies of the open type.

Another object of the invention is to provide a vehicle body of the foregoing character, in which means are provided enabling the occupants to enjoy in winter as well as in summer or during rainy weather advantages afforded by automobile bodies of the open type.

Still another object of the invention is to provide an improved automobile body having a roof curved both longitudinally and transversely of the vehicle, and a movable panel for selectively closing the roof opening, which panel is substantially straight longitudinally of the vehicle, improved means being provided to close the clearance space or opening which is formed between the roof and the movable panel.

A further object of the invention is to provide a vehicle body having a movable roof panel, in which body improved means are provided to seal the panel against draft and water leakage.

A still further object of the invention is to provide improved means for moving the roof panel into and out of closed position, such means being particularly, although not exclusively, adapted for application to vehicles of the taxicab type where it is often desirable to operate the sliding roof panel from the driver's seat.

A still further object of the invention is to provide an improved vehicle body having a roof and a skylight opening therein which can be non-transparently closed with the aid of a movable panel, or which may be transparently closed with the aid of a tranparent panel which is independent in its operation from the non-transparent panel.

A still further object of the invention is to provide a vehicle body having a roof and an opening therein selectively controlled by a transparent panel and a non-transparent panel, the transparent panel being arranged under the non-transparent panel and protected thereby when the latter is closed.

An additional object of the invention is to provide an improved vehicle body of the character specified, which is relatively simple in construction and dependable in operation, and which is relatively cheap to manufacture and service.

Other objects and advantages of this invention will appear in the following description and appended claims, reference being had to the accompanying drawings forming a part of this specification, wherein like reference characters designate corresponding parts in the several views.

Fig. 1 is a perspective view of a vehicle body embodying the present invention.

Fig. 2 is a fragmentary sectional view taken on the line 2—2 of Fig. 1, looking in the direction of the arrows.

Fig. 3 is a fragmentary sectional view taken on the line 3—3 of Fig. 1, looking in the direction of the arrows, said view illustrating the means for sealing the front edge of the movable non-transparent panel in the fully closed position thereof.

Fig. 4 is a fragmentary sectional view taken on the line 4—4 of Fig. 1, looking in the direction of the arrows, said view illustrating means for sealing the rear edge of the non-transparent movable panel in the fully closed position thereof.

Fig. 5 is a fragmentary transverse sectional view taken on the line 5—5 of Fig. 1, looking in the direction of the arrows, said view illustrating the sealing means provided along the side edges of the non-transparent movable panel, as well as the roller means carried by said panel and the ways upon which the glass panel slides.

Fig. 6 is a longitudinal sectional view taken on the line 6—6 of Fig. 1, looking in the direction of the arrows, said view illustrating both the non-transparent and the transparent panels in their fully closed positions.

Fig. 7 is a view similar in part to Fig. 6, the non-transparent panel being shown in its fully open position.

Fig. 8 is a similar view, both the non-transparent and the transparent panels being shown in their fully open positions.

Fig. 9 is a transverse sectional view taken on the line 9—9 of Fig. 1, looking in the direction of the arrows.

Fig. 10 is a fragmentary transverse sectional view taken on the line 10—10 of Fig. 7 looking in the direction of the arrows.

Fig. 11 is a fragmentary plan view of the regulator mechanism for moving the non-transparent panel.

Fig. 12 is a longitudinal section taken on the line 12—12 of Fig. 11 looking in the direction of the arrows.

Figs. 13 and 14 are longitudinal sectional views taken respectively on the line 13—13 and 14—14 of Fig. 1, looking in the direction of the arrows, said views being longitudinal continuations one of the other. Thus, when Fig. 13 is aligned with Fig. 14 at the right hand end of the latter the resulting view will illustrate a vertical longitudinal section taken through the roof parallel to the right hand track and showing the track unobstructed by the arched central portion of the roof, as is the case when longitudinal sections are taken through the middle of the roof as in Figs. 6, 7 and 8.

Fig. 15 is a sectional view taken on the line 15—15 of Fig. 1, looking in the direction of the arrows.

Fig. 16 is a fragmentary perspective view showing the ramp portions formed in the sub-panel for raising the front edge of the sliding metal panel.

Fig. 17 is an exploded view showing various parts of the roof and of the sliding panels in perspective.

Before explaining in detail the present invention it is to be understood that the invention is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated certain preferred embodiments of the invention as applied to an automobile body of the cab type having a metal roof and an opening therein controlled by a movable non-transparent panel and a sliding glass panel arranged under said non-transparent panel, said panels being movable toward the front of the vehicle for uncovering a roof opening located at the rear of the vehicle body. It will be understood, however, that the body may be constructed so that the movable panels will control an opening located at the front portion of the roof. It is also understood that the term "glass" herein used is intended to be construed in a broad sense to refer to any kind of transparent or translucent material of which the panel may be conveniently made.

Referring to the drawings and particularly to Fig. 1, there is shown a vehicle body having a roof indicated generally by the numeral 15, which roof is suitably supported by the body frame structure (not shown), the cover sheets forming the outside surfaces of the roof 15 merging smoothly into the panels or sheets forming the side, front and the rear panels of the body.

The roof 15 is provided with a generally rectangular main opening 15a extending a substantial distance in the length of the roof. The edges of the roof 15 around said opening are pressed downward to provide shoulder flanges 16. Within said roof opening there is arranged a sub-panel 17 of pan-like shape, said sub-panel being adapted to rest with its outwardly directed flanges 18 upon the shoulder flanges 16 of the roof. In the rear portion or half of the bottom of said sub-panel 17 there is provided a generally rectangular skylight aperture 19 surrounded on three sides thereof by gutter shaped flanges formed from the metal of the sub-panel, while on its fourth side the sub-panel provides a wide closed portion 20 closing, for example, about one-half of the main roof opening.

Within the roof opening and directly above the closed portion 20 there is provided an upper fixed panel 21 arranged substantially flush with the roof 15 and resting with its angle flanges 22 upon the flanges 18 of the sub-panel 17, see Fig. 2. A resilient rubber strip 23 is pressed into fixed position between the panel 21 and the roof 15 for the purpose of covering the trough or channel formed along the juncture of the flanges 22, 18 and 16, which flanges are connected together in any suitable manner, such as by means of spot welding, rivets, bolts or the like. By virtue of the above described construction a pocket 24 is formed in the front part of the roof opening adjacent to the aperture 19 and between the upper and lower fixed panels 21 and 20, into which pocket a non-transparent panel 25 may be moved to open the skylight aperture 19.

The sliding opaque panel 25 is made preferably of stamped metal and is suitably trimmed or finished on its inner surface in order to match the interior of the body, while its outside surface is finished to suit the exterior finish of the vehicle. For the purpose of facilitating the closing and opening movements of the panel 25, there are provided roller means which, in the present embodiment of the invention, comprise two pairs of rollers 26 and 27 carried by the panel 25 and cooperating with tracks or ways 28 formed along the sides of the sub-panel 17. The panel 25 is provided with flanges 30 formed by pressing the edges of the panel along its sides to provide a flat portion 30a, a rounded bead 30b and a downwardly directed flange portion 30c, the rollers 26 and 27 being secured in brackets 29 affixed to the flange portions 30c. Along the opposite longitudinal sides of the skylight aperture 19 there are provided upstanding flanges 31, while along the front and the rear ends of said aperture 19 there are formed upstanding flanges 31a and 31b. By virtue of this construction the bottom portions of the sub-panel 17 form around the skylight aperture 19 gutters serving to collect and drain off any rain water which may leak past the panel 25.

For the purpose of sealing the non-transparent movable panel 25, when the same is in its fully closed position, against draft and water leakage means are provided effecting such sealing along the sides, the rear edge and the front edge of said panel 25. Sealing of the panel 25 along the sides and the rear edge thereof is effected with the aid of a continuous U-shaped overhanging metal strip 32 which supports a waterproofed felt strip 33 bearing upon the rounded bead 30b of the flange 30. The strip 32 is pressed downward to provide offset return bent flanges 34 whereby said strip 32 is secured in suitable manner to the flanges 18 and 16 as shown in Fig. 4. Thus, when the sliding roof panel is closed, the upstanding bead 30b along its edges will be pressed against the sealing material to effect a tight seal. When the panel 25 is in its open position, rattling thereof is prevented by angle brackets 35 arranged in the pocket 24 and secured to the panel 17 along the side edges thereof as best shown in Fig. 17. The brackets 35 are provided with felt pads 36, as shown in Fig. 15.

Along the rear edge of the upper fixed panel 21 there is provided a resilient rubber sealing strip 37 suitably held therealong, such as by means of a metal retainer strip 38. Means are provided to bring the front edge of the panel 25 into tight sealing contact with the rubber sealing strip 37 (see Fig. 3), thereby effecting a water-tight joint. In the present embodiment of the invention said means comprise two ramps 39 formed, as by stamping, on the bottom of the sub-panel 17 at the skylight aperture 19, see Figs. 16 and 17. Followers 29, which in the present instance are in the form of rollers carried by suitable brackets depending from the forward edge of panel 25, are adapted to cooperate with the ramps 39. It will be understood from an examination of Figs. 3, 5 and 6 that as the panel 25 is moved rearward into its closed position, the followers 29 ride over the ramps 39, thereby bringing the front edge of the panel 25 into contact under pressure with the sealing strip 37. At this time the front rollers 26 carried by the panel 25 leave the tracks 28 and are raised therefrom, as shown in Figs. 5 and 9. A conventional windlace and a tacking strip are provided at all four sides of the skylight aperture 19, the headlining 40 being secured to the tacking strip in conventional manner. It will now be understood, in view of the foregoing, that when the panel 25 is in its fully closed position, it is tightly sealed around all four sides thereof against leakage and draft as well as against the possibility of rattling.

Means for moving the panel 25 into and out of the pocket 24 are exemplified by an improved regulator mechanism mounted in a countersunk or depressed portion 20a pressed into the metal of the closed portion 20 of the sub-panel 17. The mechanism includes a mounting plate 70 secured by spacer rivets 71 to the countersunk portion 20a. The regulator mechanism also comprises a rotatable handle 41 journalled in the mounting plate and arranged within convenient reach of the driver of the vehicle, which handle carries a small gear or pinion 42 meshing with a train of gears including three large idle gears 43, 44 and 45 arranged longitudinally in line with the gear 42, thereby disposing the handle 41 at the extreme forward end of the sub-panel 17 out of the path of the sliding glass panel. The shaft of the gear 45 carries a pinion 46 arranged concentrically with said gear 45 and constrained to rotate therewith, which gear meshes with two larger meshing gears 47 and 48. To said gears 47 and 48 are secured radially extending arms 49 and 50. Secured to the opposite or outer end of each arm is a headed stud or finger 51 adapted to slide along a slot provided in a long bracket or retainer strip 52 welded or otherwise secured to the front edge of the panel 25, see Fig. 17. The strips 52 are located equidistant from the longitudinal center line of the body. Rotation of the handle 41 operates to rotate the meshing gears 47 and 48, thereby rotating or swinging the arms 49 and 50 around the centers of the gears 47 and 48 and increasing or decreasing the angle formed by said arms. The rotation of the arms 49 and 50 operates to pull the panel 25 into the pocket 24 for opening the skylight aperture 19, or to push said panel 25 out of the pocket 24 for closing said aperture 19. These arms are preferably located so as to be at equal distances from the longitudinal center line of the sliding roof panel and at opposite sides thereof.

In order to permit the studs 51 of the arms 49 and 50 to move upward in following the upward movement of the front edge of the panel 25 on the ramps 39, hinges 53 and 54 are provided on said arms. A spring 55 is provided on the shank of each stud 51 and is interposed between the head of the stud and the arm in order to ensure tight engagement of said stud in the slot without the possibility of binding because of the vertical movement of the panel 25. It is to be noted that the regulator mechanism is irreversible, and because of the irreversibility thereof the panel 25 is automatically locked in any position, whereby undesirable movements of the panel upon the sudden application of brakes or when the vehicle is accelerating, is eliminated.

It is an important feature of the present invention that the skylight aperture 19 may be transparently closed by means of a sliding panel 56, the movements of which are entirely independent from those of the non-transparent panel 25. In the present embodiment of the invention said sliding panel comprises two glass half-panels 57 and 58, each of which is provided with a metal frame 59 around three sides thereof. Said half-panels 57 and 58 are connected together in a manner clearly illustrated in Fig. 10 by means of frame members 61 and 62 which are connected together in any suitable manner so as to clamp the adjacent edges of the glass panes 57 and 58, a rubber gasket 60 being interposed between the glass panels and said frame 59. Along the opposite sides of the sub-panel 17 there are provided glass runways or slots in which the panel 56 is adapted to slide. In the present embodiment of the invention said ways are formed by long angular strips 63 extending substantially throughout the entire length of the roof opening and spot welded or otherwise secured to the sub-panel 17, see Fig. 5, along the sides thereof. To said brackets or angle strips 63 there are secured conventional tacking strips 64 supporting the headlining 40. A wooden frame member 65 is secured to the sub-panel 17 along the rear edge of the skylight aperture 19, said member 65 being adapted to serve as a rear stop for said sliding panel 56. The sliding panel 56 is movable manually in the runways formed by the bracket 63, for which purpose knobs 66 are provided at the rear edge of said panel 56 as shown in Fig. 4. In order to provide necessary friction for preventing self-sliding of the panel 56 when the vehicle is in motion, as well as objectionable squeaks when the panel is moved manually, relatively stiff channel shaped felt or other non-metallic linings 67 are provided in the runways, and the same are held between the lower flange 63a and a series of lugs 63b pressed or struck out from the upstanding side portions of the brackets 63.

From the foregoing it will be seen that there is provided a motor vehicle body having a skylight opening adapted to be controlled by a main non-transparent sliding roof panel, preferably in the form of a metal stamping, adapted when closed to seal the opening and lie substantially flush with the surrounding portions of the roof. The skylight opening is also adapted to be controlled by a sliding transparent or glass panel preferably arranged beneath the main panel and normally protected thereby. Thus when the skylight opening is opened upon shifting the main panel this opening may be controlled at will by shifting the glass panel into various positions while at the same time permitting the passage of light therethrough and fresh air as desired. Considered from one of its broader aspects, the roof 15 may be regarded as a double-wall roof, the main roof sheet and the upper fixed panel 21 forming the upper wall thereof, while the sub-panel 17 forms the lower wall. The non-transparent panel 25 is adapted to move within the space formed between said walls, while the transparent panel 56 is adapted to move underneath said lower wall. During normal usage when the roof is closed it will be noted that the glass panel is fully protected by the main sliding panel overlying it. By virtue of this construction, therefore, protection of the glass panel against breakage and the accumulation on its surface of dirt and other foreign matter is adequately provided.

I claim:

1. In a vehicle body, a roof having an opening therein substantially throughout its entire length, a sub-panel secured in said roof opening and provided with a skylight aperture in its bottom; an upper fixed panel secured in the roof opening above the closed portion of the bottom of the sub-panel to form a pocket therewith; a substantially rigid non-transparent panel movable into and out of said pocket to open and to close selectively said skylight opening; a regulator mounted on said sub-panel and including a rotatable handle and arms drivingly connected with said handle and connected with said non-transparent panel for moving the same in response to rotation of said handle; and a glass panel arranged under said non-transparent panel and slidable independently of said non-transparent panel into and out of position to open and to close transparently said skylight opening.

2. In a vehicle body, a roof having an opening therein substantially throughout its entire length, a sub-panel secured in said roof opening and provided with a skylight aperture in its bottom; an upper fixed panel secured in the roof opening above the closed portion of the bottom of the sub-panel to form a pocket therewith; a substantially rigid non-transparent panel movable into and out of said pocket to open and to close selectively said skylight opening; a regulator mounted on said sub-panel and including a rotatable handle and arms drivingly connected with said handle and connected with said non-transparent panel for moving the same in response to rotation of said handle; a glass panel arranged under said non-transparent panel and manually slidable independently of said non-transparent panel into and out of position to open and to close transparently said skylight opening; and non-metallic sealing means for said glass panel frictionally engaging the edges thereof.

3. In a vehicle body, a roof having an opening therein substantially throughout its entire length, a sub-panel provided with a skylight aperture and secured in said roof opening, an upper fixed panel secured in the roof opening to form with the closed portion of said sub-panel a pocket adjacent to said skylight aperture, a substantially rigid non-transparent panel movable into and out of said pocket to open and to close selectively said skylight aperture, parallel ways provided on said sub-panel, and a transparent panel adapted to slide in said ways to open and to close said skylight aperture independently of said non-transparent panel.

4. In a vehicle body, a roof having an opening therein, a sub-panel provided with a skylight aperture and secured in said roof opening, an upper fixed panel secured in the roof opening to form with the closed portion of said sub-panel a pocket adjacent to said skylight aperture, a non-transparent panel movable into and out of said pocket to open and to close selectively said skylight aperture, parallel ways provided on said sub-panel, ramps provided on said sub-panel and followers carried by said non-transparent panel, said ramps and said followers being adapted to raise the edge of the non-transparent panel into contact under pressure with the upper fixed panel, and a transparent panel adapted to slide in said ways to open and to close said skylight aperture independently of said non-transparent panel.

5. In a vehicle body, a roof having an opening therein, a sub-panel provided with a skylight aperture and secured in said roof opening, an upper fixed panel secured in the roof opening to form with the closed portion of said sub-panel a pocket adjacent to said skylight aperture, a non-transparent panel movable into and out of said pocket to open and to close selectively said skylight aperture, members carried along opposite sides of said sub-panel and forming longitudinal runways at opposite sides of said roof opening, and a glass panel adapted to slide in the runways for selectively opening and closing said skylight aperture independently of said non-transparent panel.

6. A structure as defined by claim 5, in which the glass panel comprises a pair of angularly related glass panels connected together at their meeting edges along the longitudinal center line of the body.

7. In a vehicle body, a roof having an opening therein, a pair of superimposed sliding panels independently movable into and out of positions to control said opening, the upper panel being opaque and the lower panel being transparent, and means for shifting said upper panel independently of the lower panel, said means comprising a pair of swinging arms slidingly connected to one end of the upper panel and an operating handle drivingly connected to said arms and located out of the path of travel of the lower panel.

8. In a vehicle body, a roof having an opening therein, a pair of superimposed sliding panels independently movable into and out of positions to control said opening, the upper panel being opaque and the lower panel being transparent, and means for shifting the upper panel and located out of the path of travel of the lower panel.

9. In a vehicle body, a roof having a skylight opening therein, a pair of superimposed relatively slidable panels for controlling said opening, and means out of the path of travel of the lower panel for shifting the upper panel, said means including an operating handle extending past one end of the lower panel at the extreme end of the travel in one direction.

10. In a vehicle body, a roof comprising a pair of superimposed fixed roof panels spaced apart to provide a pocket therebetween, the roof having a skylight opening at one side of the pocket, a pair of superimposed sliding panels for controlling said opening, one sliding panel being movable into the pocket and the other being movable beneath the pocket, and means for guiding each sliding panel during its travel.

11. In a vehicle body, a roof comprising a pair of superimposed fixed roof panels spaced apart to provide a pocket therebetween, the roof having a skylight opening at one side of the pocket, a pair of superimposed sliding panels for controlling said opening, one sliding panel being movable into the pocket and the other being movable beneath the pocket, means for guiding each sliding panel during its travel, and means for sealing the upper sliding panel around the edges of said opening when closed thereby.

12. In a vehicle body, a roof comprising a pair of superimposed fixed roof panels spaced apart to provide a pocket therebetween, the roof having a skylight opening at one side of the pocket, a pair of superimposed sliding panels for controlling said opening, one sliding panel being movable into the pocket and the other being movable beneath the pocket, and means out of the path of the lower panel and accessible at a point below the same for shifting the upper sliding panel.

13. In a vehicle body, a roof comprising fixed outer paneling and a skylight opening at one side thereof, a pair of superimposed sliding panels effective to close said opening, the upper panel being movable from beneath said fixed paneling to a closed position in said opening substantially flush with the outer paneling, means disposed out of path of travel of said lower panel for shifting the upper sliding panel, and means for raising one end of the last named panel when closed to position it substantially flush with said outer paneling.

14. In a vehicle body, a roof comprising fixed outer paneling and a skylight opening at one side thereof, a pair of superimposed sliding panels effective to close said opening, the upper panel being metal and movable from beneath said fixed paneling to a closed position in said opening substantially flush with the outer paneling, the lower panel being transparent, means for shifting the upper sliding panel, and means for raising one end of the last named panel when closed to position it substantially flush with said outer paneling.

15. In a vehicle body, a roof comprising a pair of superimposed fixed roof panels spaced apart to provide a pocket therebetween, the roof having a skylight opening at one side of the pocket, a pair of superimposed sliding panels for controlling said opening, one sliding panel being movable into the pocket and the other being movable beneath the pocket, means for guiding each sliding panel during its travel, and means for sealing the upper sliding panel around the edges of said opening when closed thereby, said lower sliding panel being glass and being manually shiftable independently of the upper sliding panel.

16. In a vehicle body, a double-wall roof, the upper and the lower walls of said roof being provided with two registering openings, a substantially rigid non-transparent panel movable within the space formed between said walls, said panel being supported by the lower wall and adapted to come in its closed position in watertight sealing contact with the edges of said upper wall around the opening provided therein thus closing said opening, and a transparent panel provided underneath said lower wall and adapted to come in its closed position into substantially draft-proof contact with the edges of said lower wall around the opening thereof.

JOHN VOTYPKA